April 25, 1961
C. P. SALMON
THERMOSTAT VALVE
Filed Oct. 27, 1958
2,981,478
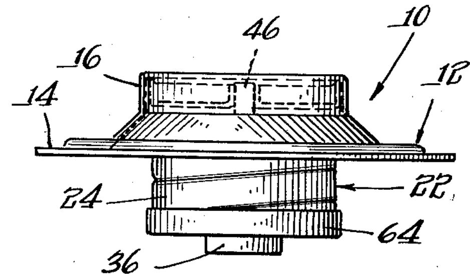
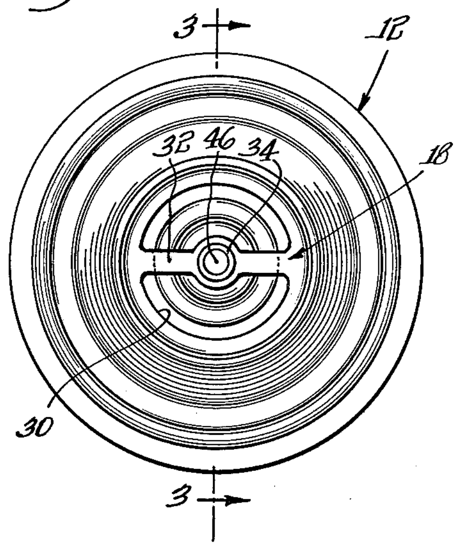
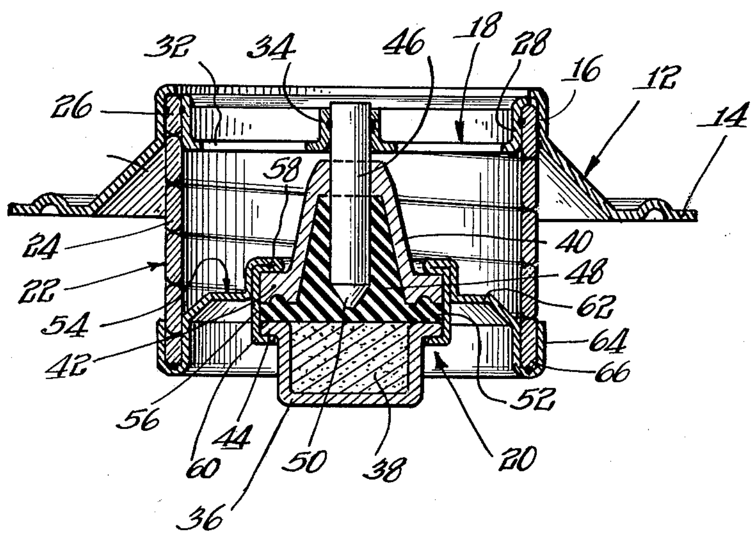
INVENTOR.
Clarence P. Salmon
BY: Olson & Trexler
Attys United States Patent Office 2,981,478

Patented Apr. 25, 1961

2,981,478

THERMOSTAT VALVE

Clarence P. Salmon, Elgin, Ill., assignor to Flexonics Corporation, Maywood, Ill., a corporation of Illinois Filed Oct. 27, 1958, Ser. No. 769,647

1 Claim. (Cl. 236—34)

The present invention relates to a novel thermostat valve, and more particularly to a novel thermostat valve of the type frequently used for controlling the flow of a cooling fluid in the cooling system of an internal combustion engine.

Various thermostat valves have heretofore been suggested which include a capsule structure with a heat responsive material for controlling the position of a valve member. In certain of the heretofore proposed capsule structures, high internal pressures may be developed at elevated temperatures so that the capsule structure must be provided with a very strong shell. Thus, difficulties have been encountered in attempting to provide structures which may be economically produced and assembled and which will operate efficiently and have a quick response to temperature changes. For example, certain relatively strong materials such as stainless steel are also relatively poor conductors of heat so that a thermostat valve structure of the type contemplated herein utilizing such materials may not be sufficiently rapidly acting for many installations. On the other hand, materials such as copper which are good heat conductors are relatively weak so that a greater weight of thickness of such materials must be used in order to provide the necessary strength. This, however, may unduly increase the cost and difficulties of fabricating the capsule structure.

An important object of the present invention is to provide a novel thermostat structure of the type discussed above, which structure is such that it may be economically produced and it is capable of withstanding high internal pressures and of efficient quick operation.

A more specific object of the present invention is to provide a novel thermostat valve of the above described type which is constructed so as to utilize the desirable characteristics and minimize the effect of the undesirable characteristics of good heat conducting materials such as copper and of high strength materials such as stainless steel.

Still another object of the present invention is to provide a novel thermostat valve which is constructed so that parts thereof may be readily and economically fabricated and assembled.

Other objects and advantages of the present invention will become apparent from the following description and the accompanying drawings wherein:

Fig. 1 is a side elevational view of a thermostat valve incorporating features of the present invention;

Fig. 2 is an enlarged plan view of the structure shown in Fig. 1; and

Fig. 3 is a sectional view taken generally along line 3—3 in Fig. 2.

Referring now more specifically to the drawings wherein like parts are designated by the same numerals throughout the various figures, a thermostat valve structure 10 incorporating features of the present invention is of the type adapted to be mounted in the cooling system, not shown, of an internal combustion engine for controlling the flow of cooling fluid to a heat exchanger or radiator. Thus, the valve structure is provided with a mounting member 12 having a peripheral flange portion 14 which may, for example, be clamped between an engine block and a complementary fitting, not shown, of the cooling system. The mounting member is provided with an inner marginal cylindrical portion 16 to which a support member 18 is secured in the manner described below, and a temperature responsive unit 20 is fixed with respect to the support member for controlling the operation of valve means 22 also in the manner described in detail below.

In the structure disclosed for the purpose of illustrating the present invention, the valve means comprises a spring 24 having a plurality of helical convolutions normally disposed in abutting relationship as shown thus in Fig. 3 so as to prevent the flow of fluid therethrough. One end convolution 26 is disposed between the cylindrical portion 16 of the mounting member and a cylindrical portion 28 of the support member 18. The cylindrical portions 16 and 28 of the mounting and support members are welded to the convolution 26 for securing the various elements together in assembled relationship. As shown in Figs. 2 and 3, the support member 18 is provided with a central opening 30 which defines a passageway for fluid to flow through the valve structure when the valve means is opened. A bridge element 32 of the support member traverses the opening 30 and is provided with a central tubular boss 34 adapted to be interconnected with the temperature responsive unit 20 in the manner described below.

The temperature responsive unit which is shown best in Fig. 3 includes a cup element 36 which is filled with a body of temperature responsive material 38. The temperature responsive material may be of a known composition and it suffices to state that this material is such that it has the characteristic of expanding and providing a raised internal pressure within the unit 20 when the temperature to which the unit is subjected becomes elevated. In order to obtain efficient operation and rapid response to changes in temperature to which the unit 20 is subjected, the cup element 36 is formed from a good heat conducting material such as copper and the like. As will be understood, the pressure developed within the temperature responsive unit 20 may become very high. Therefore, the structurally relatively weak but good heat conducting material of the cup element is made relatively thick so as to enable the cup element to accommodate the pressures and thrust which may be encountered during the operation of the valve structure. Since the cup element is of simple configuration and is a small portion of the temperature responsive unit 20, the use of relatively heavy copper and the like for producing the cup element does not unduly increase the bulk and manufacturing cost of the unit.

The temperature responsive unit 20 is provided with a closure member 40 over the cup element, which closure member has a hollow frusto-conical upstanding portion and a radially extending base or flange portion 42 which overlies a radially extending peripheral flange 44 of the cup element 36. A stem 46 slidably extends through a complementary aperture in the upper end of the closure member 40. An upper end of the stem 46 extends into and is welded or otherwise fixed to the tubular boss 34 of the support member. A lower end of the stem extends into a member 48 which fills the hollow frusto-conical closure member and which is formed from a resilient material such as rubber and the like. As shown in Fig. 3 the lower terminal end 50 of the stem is beveled or pointed so that when the rubber or rubber-like member 48 is compressed as a result of an elevated pressure provided by the temperature responsive material 38, the resilient member 48 acts against the end 50 for relatively forcing the stem 46 outwardly with respect to the closure. Since, however, the outer end of the stem is fixed to the support member 18, relative extension of the stem from the closure and thus the cup element 36 causes the main body of the temperature responsive unit to move away from the support member and the valve means to open in the manner described below.

In order to seal the connection between the cup element and the closure, the resilient member 48 is provided with a radially extending base flange 52 which is disposed between the above mentioned flanges 42 and 44 of the closure and the cup element. In addition means is provided for aggressively clamping and retaining the flanges together. More specifically, the structure is provided with a one piece member 54 having a first cylindrical section 56 embracing the peripheries of the flanges 42, 44 and 52 and terminating at its opposite ends in inturned opposing flanges 58 and 60 which respectively overlie and underlie the flanges 42 and 44. The structure of the embracing section 56 and the flanges 58 and 60 is such that the flange portions 42, 44 and 52 are aggressively and securely clamped together for obtaining a sealed connection between the various parts of the unit 20.

In order to facilitate more economical production and assembly of the valve structure, the member 54 is provided with a generally radially outwardly extending section 62 which is integrally joined to and doubled back over the flange portion 58 and which is adapted to be connected to the valve spring 24. As shown in Fig. 3, the section 62 of the member 54 is provided with a peripheral portion 64 having a generally U-shaped cross section and accommodating an end convolution 66 of the spring 22. The convolution is welded or otherwise secured to the peripheral portion 64 of the member 54.

As indicated above, internal pressures developed within the temperature responsive unit may become quite high and therefore the embracing or retaining section 56 and its associated flanges must have considerable strength in order to accommodate the thrust tending to separate the flanges 42 and 44. This is accomplishing by forming the member 54 from a material such as stainless steel which is structurally stronger than the material from which the cup element 36 is formed. Furthermore, the high strength material used for the member 54 enables the member to be relatively thin as compared with the thickness of the material in the cup element 36 whereby easier and more economical production and assembly of the member 54 may be accomplished and the bulk of the structure may be minimized. It is also to be noted that the one piece construction of the member 54, which has an inner marginal section interconnected with and forming a part of the temperature responsive unit and an outer marginal section interconnected with and forming a part of the valve means, simplifies and facilitates assembly of the structure since the member 54 is initially associated with the unit 20 and may easily be aligned with and connected to the flexible spring element of the valve structure.

As will be understood, the valve means of the structure described above is normally closed as shown in Fig. 3.

Then upon subjecting the structure to a rising temperature, heat is transferred rapidly through the material of the cup element 36 for raising the temperature of the material 38. When the material 38 reaches a predetermined temperature, a pressure is created in the unit 20 which compresses the resilient member 48 which then acts against the fixed stem 46 for forcing the cup element and the closure and thus the member 54 away from the fixed support member 18. Since the member 54 is secured to an end convolution of the spring 24, the spring is stretched so that its convolutions are spread apart in order to permit fluid to flow therebetween and through the valve structure.

While the preferred embodiments of the present invention have been shown and described herein, it is obvious that many structural details may be changed without departing from the spirit and scope of the appended claim.

The invention is claimed as follows:

A thermostatic valve comprising a one-piece solid wire in the form of a coiled spring arranged in cylindrical form with contiguous convolutions contacting one another to close the valve but separable to permit fluid flow therebetween, a mounting member having an annular channel formation in which one end of the coiled spring is secured and said mounting member being apertured interiorly of the channel formation to permit flow of fluid to the interior of the coiled spring, a closure member of relatively high strength sheet metal including an outwardly extending annular portion and a channel in opposing alignment with the channel formation on said mounting member and in which the opposite end of said coiled spring is secured, a temperature responsive assembly including axially elongated closure means having outward annular flange means remote from said mounting member and a cup member formed of relatively highly conductive material housing therein temperature responsive material and including an outward flange disposed immediately adjacent the flange means on said elongated closure means, and a stem fixed to said mounting member with a relatively slidable connection with said elongated closure means, and said closure member of sheet metal terminating in an inward flange trapping the flange on said cup member and leaving the remainder of the cup member exposed and including a reversely bent double thickness inward flange trapping the remote side of the flange means on said elongated closure means whereby to mount the temperature responsive assembly and permit the separately formed cup member of relatively highly conductive material to be exposed with secure mounting of the temperature responsive assembly between the inward flanges on the closure member of high strength sheet metal.

References Cited in the file of this patent

UNITED STATES PATENTS

| | | |
|---|---|---|
| 2,368,182 | Vernet | Jan. 30, 1945 |
| 2,532,896 | Dillman | Dec. 5, 1950 |
| 2,636,776 | Vernet | Apr. 28, 1953 |
| 2,797,873 | Woods | July 2, 1957 |
| 2,810,523 | Branson | Oct. 22, 1957 |
| 2,842,318 | Campbell | July 8, 1958 |